July 22, 1924.

C. W. BECK

STEERING WHEEL

Filed May 21, 1923

Inventor
Charles W. Beck
By Whittemore Hulbert Whittemore
& Belknap           Attorneys July 22, 1924.
C. W. BECK
STEERING WHEEL
Filed May 21, 1923
1,502,540
3 Sheets-Sheet 2
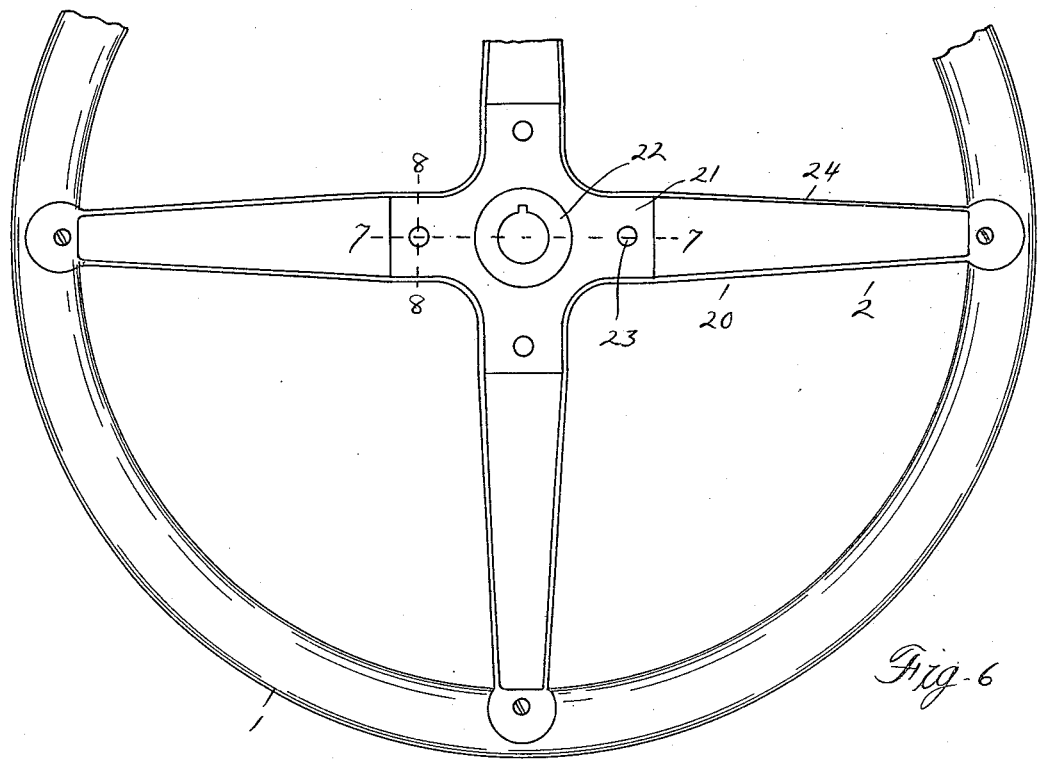
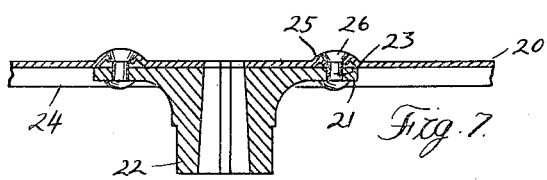
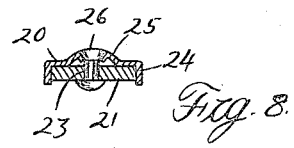
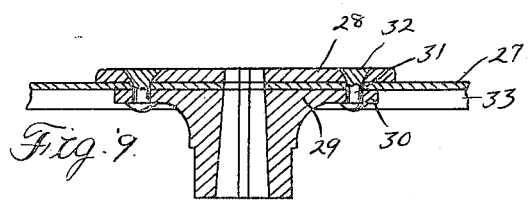
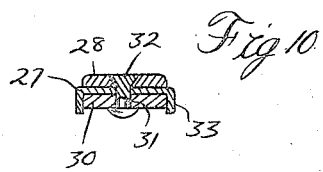
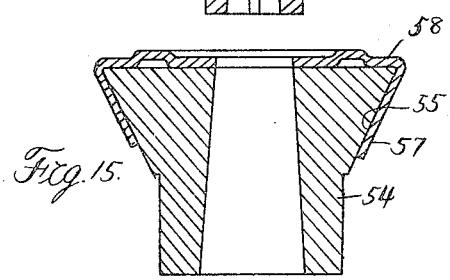
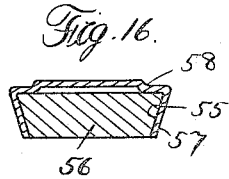
Inventor
Charles W. Beck
By Whittemore Hulbert Whittemore
+Belknap       Attorneys July 22, 1924.
C. W. BECK
STEERING WHEEL
Filed May 21, 1923
1,502,540
3 Sheets-Sheet 3
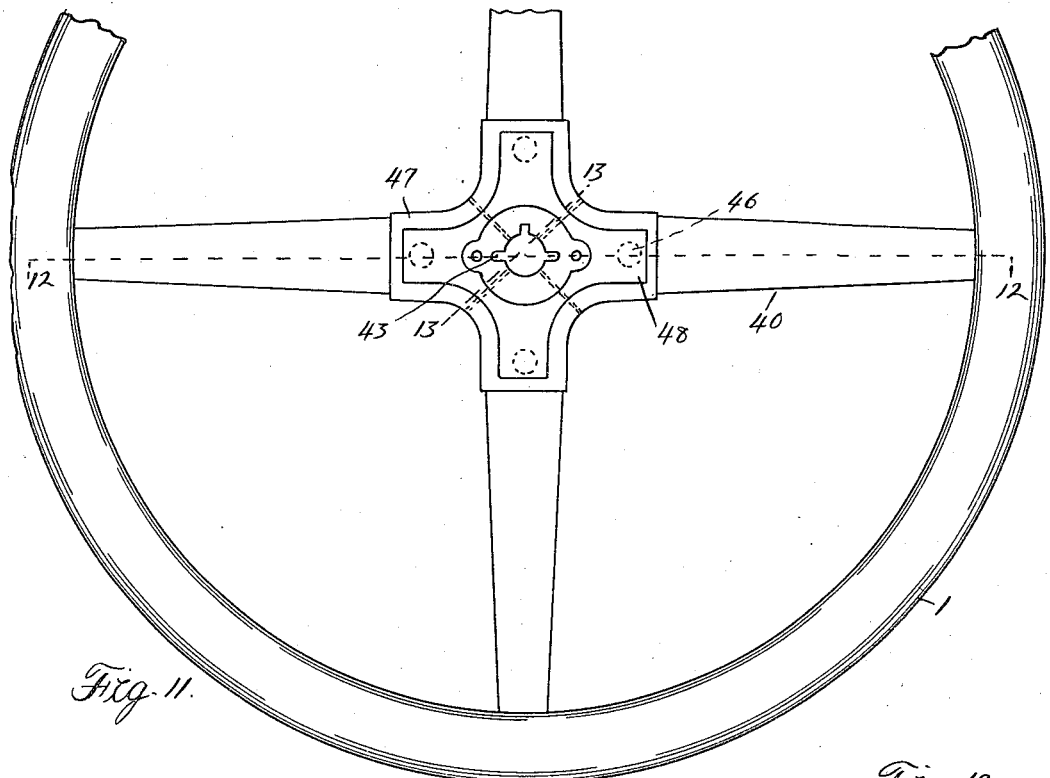
Fig. 11.
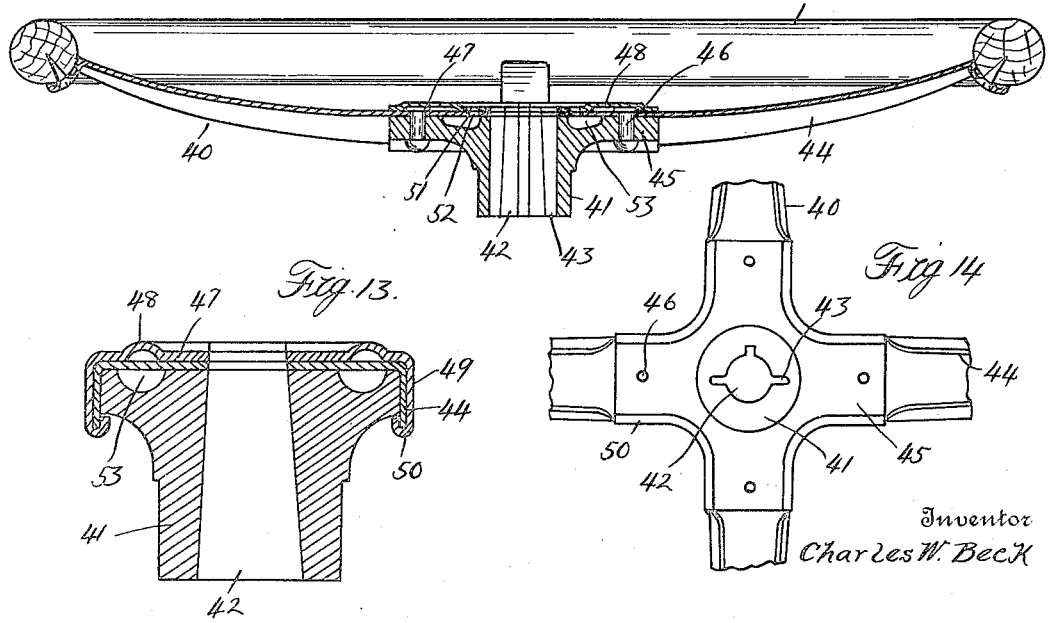
Fig. 12.
Fig. 13.
Fig. 14.
Inventor
Charles W. Beck
By Whittemore Hulbert Whittemore
& Belknap            Attorneys Patented July 22, 1924.

1,502,540

UNITED STATES PATENT OFFICE.

CHARLES W. BECK, OF DETROIT, MICHIGAN, ASSIGNOR TO BECK-FROST CORPORATION, OF DETROIT, MICHIGAN, A CORPORATION OF MICHIGAN.

STEERING WHEEL.

Application filed May 21, 1923. Serial No. 640,588.

*To all whom it may concern:*

Be it known that I, CHARLES W. BECK, a citizen of the United States of America, residing at Detroit, in the county of Wayne and State of Michigan, have invented certain new and useful Improvements in Steering Wheels, of which the following is a specification, reference being had therein to the accompanying drawings.

This invention relates to steering wheels for motor vehicles, boats or the like and refers particularly to wheels wherein the spider or metal part is preferably of the built-up and assembled type.

An object of the invention is to provide a strong and durable steering wheel in which the metal parts of the spider are rigidly secured together by simple and effective means.

Another object is to provide a strong and durable wheel which is simple in construction and which can be manufactured at a comparatively low cost.

With the above and other objects in view, the invention consists in certain novel features of construction, combination and arrangement of parts as will be more fully described and particularly pointed out in the appended claims.

In the accompanying drawings:—

Figure 6 is a fragmentary bottom plan view of a slightly modified form of wheel;

Figure 7 is a fragmentary sectional view taken on line 7—7 of Figure 6;

Figure 8 is a sectional view taken on line 8—8 of Figure 6;

Figure 9 is a fragmentary sectional view similar to Figure 7 but showing a slightly modified form of construction;

Figure 10 is a sectional view similar to Figure 8 but showing a slightly modified form of construction;

Figure 11 is a fragmentary top plan view of another slightly modified form of wheel;

Figure 12 is a sectional view taken on line 12—12 of Figure 11;

Figure 13 is a sectional view taken on line 13—13 of Figure 11;

Figure 14 is a fragmentary bottom plan view of the wheel shown in Figure 11;

Figure 15 is a view similar to Figure 3 but showing a slightly modified construction;

Figure 16 is a view similar to Figure 4 but showing a slightly modified form of construction.

Figure 1:
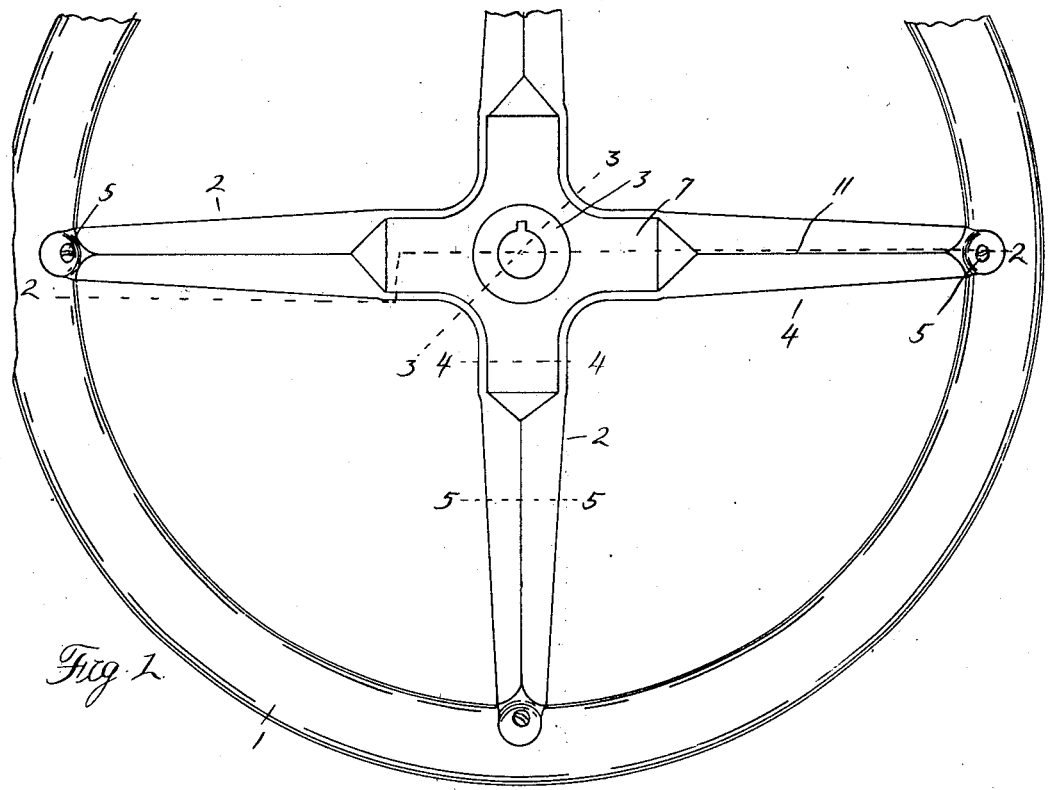
Figure 1 is a fragmentary bottom plan view of a steering wheel embodying my invention.
Figure 2:
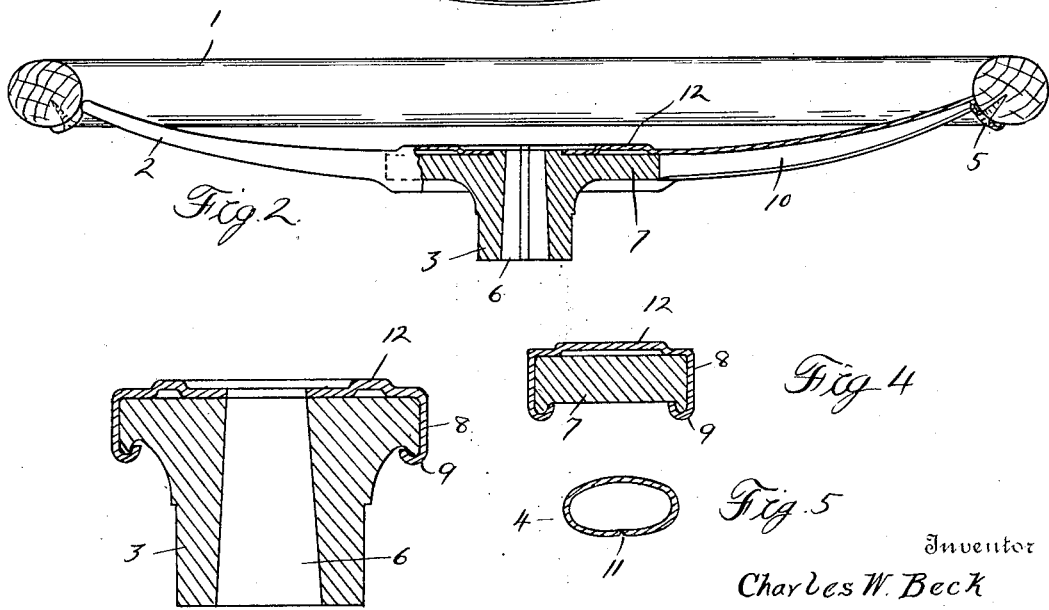
Figure 2 is a sectional view taken on line 2—2 of Figure 1.
Figure 3:
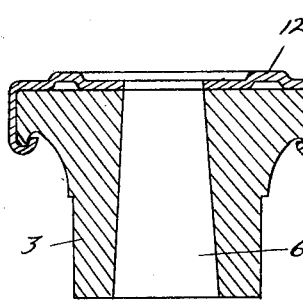
Figure 3 is a sectional view taken on line 3—3 of Figure 1.
Figure 4:
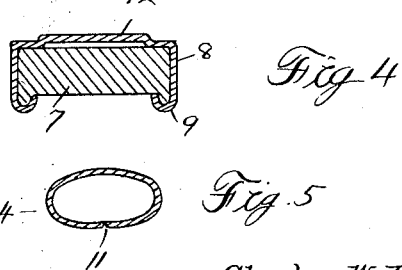
Figure 4 is a sectional view taken on line 4—4 of Figure 1.
Figure 5:
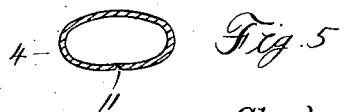
Figure 5 is a sectional view taken on line 5—5 of Figure 1.

Referring now to the drawings in which like characters of reference designate corresponding parts throughout the several views, the numeral 1 designates a rim, preferably of wood, supported upon a metallic spider 2 which includes a hub piece 3 and a plurality of radially extending arms 4.

The arms are preferably formed from one sheet of material and are preferably detachably secured at their outer ends to the rim by means of screws 5. The hub piece 3 is preferably a malleable casting having a tapering bore 6 to receive a steering stem (not shown) and is preferably provided at its upper end with a plurality of radially extending projections 7 upon which the inner ends of the arms 4 rest. For rigidly securing the hub piece 3 to the arms, the latter are preferably provided at their inner ends with parallel depending flanges 8 which are preferably crimped over marginal beading 9 preferably formed integral with the lower face of the hub piece.

For strengthening the wheel construction, the arms 4 are preferably provided intermediate their ends with depending flanges 10 which are preferably curved inwardly so that the edges thereof meet as shown at 11, while the portions of the arms over the hub piece are preferably embossed as shown at 12.

In Figures 6 to 8 inclusive, I have shown a steering wheel in which the arms 20 of the spider are preferably formed integral with each other at their inner ends and are preferably secured to radially extending projections 21 of a hub piece 22 by means of rivets 23. The arms 20 are preferably provided at their opposite edges with depending flanges 24 which engage opposite sides of the projections 21 shown clearly in Figure 8 and are also provided with embossed portions 25 that receive the heads 26 of the rivets 23.

In Figures 9 and 10, I have shown a wheel construction in which the arms 27 are preferably formed separately and are preferably welded together at their inner ends. In this construction the joint between the inner ends of the arms are preferably concealed and the spider is preferably reinforced by means of a top plate 28 which preferably conforms in shape to the upper face of the hub piece 29 supporting the arms 27. The top plate 28 is secured to the arms and to the registering radially extending projections 30 of the hub piece by means of rivets 31 that preferably have their heads 32 countersunk in the plate 28. These arms are also preferably provided with depending flanges 33 which engage the opposite edges of the projections 30 as shown clearly in Figure 10.

In Figures 11 to 14 inclusive, I have shown a steering wheel construction in which the arms 40 of the spider are formed separately and are preferably assembled upon a hub piece 41. So that the inner ends thereof are spaced slightly apart. The hub piece 41 is preferably a malleable casting and is provided with a tapering bore 42 to receive a steering stem (not shown). The hub piece 41 is also preferably provided with a pair of diametrically opposed longitudinally extending slots 43 for receiving the horn button electrical conductors (not shown). The arms 40 are preferably provided with depending flanges 44 that engage opposite sides of radially extending projections 45 of the hub piece 41 and are secured to the radially extending projections by means of rivets 46. To conceal the rivets as well as the joints between the arms, I preferably provided a top plate 47 which rests upon the arms 40 and which conforms in shape to the upper face of the hub piece 41. The top plate 47 is preferably embossed as shown at 48 to receive the heads of the rivets 46 and is preferably provided with depending marginal flanges 49 that are preferably crimped over the lower edges of the flanges 44 of the arms as shown at 50.

In order that the horn push botton casing (not shown) may be readily mounted on the top plate 47, I preferably provide aligned threaded openings 51 and 52 respectively in the top plate 47 and arms 40 for receiving the securing elements (not shown). To permit of easy drilling, I also preferably provide a substantially circular channel 53 in the upper face of the hub piece 41 beneath the aligned threaded openings 51 and 52 respectively.

In Figures 15 and 16, I have shown a construction in which the curved edges 53 of the hub 54, as well as the opposite side edges 55 of the radially extending projections 56, taper downwardly and inwardly and are embraced by means of correspondingly shaped flanges 57 extending downwardly from the radially extending arms 58. Thus, I provide a rigid construction in which no rivets or other securing elements are required. Furthermore, the arms cannot rotate relative to the hub for the reason that the projections of the hub are at right angles to each other and are secured between the depending flanges of the arms.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. A steering wheel comprising a hub piece having integral radially extending, projections, radially extending arms resting upon said projections and having flanges crimped over projections upon said hub piece, and a rim carried by said arms.

2. A steering wheel comprising a hub piece having integral radially extending projections, radially extending arms resting upon said projections, members extending downwardly from said hub piece, flanges extending downwardly from said arms and having portions crimped over said members, and a rim carried by said arms.

3. A steering wheel comprising a hub piece having integral radially extending projections, radially extending arms engaging said projections, means for securing said arms to said projections, means for concealing said securing means, and a rim carried by said arms.

4. A steering wheel comprising a hub piece having radially extending projections, a plurality of separately formed radially extending arms secured to said projections, flanges extending from said arms and engaging said projections, means for concealing the joint between said arms, said concealing means being crimped over the edges of said flanges, and a rim carried by said arms.

5. A steering wheel comprising a hub piece and radially extending projections, radially extending arms secured to said projections, a top plate secured to said arms, said top plate and arms having aligned openings therein, said hub piece having a channel therein registering with said openings, and a rim carried by said arms.

6. In a steering wheel, a hub piece having radially extending projections, and curved portions connecting said projections, marginal flanges extending downwardly from said hub piece and projections, and arms engaging said projections and having flanges secured to the flanges aforesaid.

7. A steering wheel comprising a hub piece having integral radially extending projections, radially extending arms resting on said projections and having flanges engaging opposite sides thereof, means for securing said arms to said projections, means for concealing said securing means and flanges, and a rim carried by said arms.

8. In a steering wheel, a hub piece having radially extending projections and inwardly curved portions connecting said projections at their inner ends, flanges extending downwardly from said projections, and spider arms resting on said projections and having flanges secured to the flanges aforesaid.

9. In a steering wheel, a shaft member having projections, a spider having a plurality of arms resting thereon, said arms having flared flanges running from one projection to the other projection, said flanges embracing and underlying the edges of said shaft member and said projections.

10. In a steering wheel, a shaft member having projections, a spider having a plurality of arms resting thereon, said shaft member having depending flanges cooperating with flanges on the spider and running from one projection to the other projection, and flanges on said arms embracing the shaft member and the flanges thereon.

11. In a steering wheel, a shaft member with projections, a spider member with a plurality of arms, the inner ends of said arms being flared and having flanges cooperating with said projections, said flanges interlockingly engaging the said shaft member and projections.

In testimony whereof I affix my signature.

CHARLES W. BECK.